(12) United States Patent
Coppinger et al.

(10) Patent No.: US 10,485,180 B2
(45) Date of Patent: Nov. 26, 2019

(54) AGRICULTURAL HARVESTER AUGER ASSEMBLY WITH CROP MATERIAL DEFLECTING COVER

(71) Applicant: CNH Industrial America LLC, New Holland, PA (US)

(72) Inventors: Jason R. Coppinger, Davenport, IA (US); Tyler D. Brockel, LeClaire, IA (US); Clay Alan Reinecke, Blue Grass, IA (US); Craig A. Murray, Davenport, IA (US); William L. Cooksey, Geneseo, IL (US); Eric E. Veikle, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 99 days.

(21) Appl. No.: 15/570,613

(22) PCT Filed: Apr. 29, 2016

(86) PCT No.: PCT/US2016/030147
§ 371 (c)(1),
(2) Date: Oct. 30, 2017

(87) PCT Pub. No.: WO2016/176587
PCT Pub. Date: Nov. 3, 2016

(65) Prior Publication Data
US 2018/0279558 A1 Oct. 4, 2018

Related U.S. Application Data

(60) Provisional application No. 62/154,925, filed on Apr. 30, 2015.

(51) Int. Cl.
*A01F 12/46* (2006.01)
*A01D 61/00* (2006.01)
*A01F 12/44* (2006.01)

(52) U.S. Cl.
CPC .......... *A01F 12/46* (2013.01); *A01D 61/004* (2013.01); *A01F 12/446* (2013.01)

(58) Field of Classification Search
CPC ........ A01F 12/46; A01F 12/44; A01F 12/444; A01F 12/446; A01D 41/1208; A01D 41/1217; A01D 61/004
See application file for complete search history.

(56) References Cited

U.S. PATENT DOCUMENTS 1,811,064 A 6/1931 Raney et al.
2,776,078 A * 1/1957 Raynor ............... B65D 90/582
222/413

(Continued)

FOREIGN PATENT DOCUMENTS

FR 2160142 * 6/1973 ............ A01F 12/00
GB 1406265 A 9/1975
WO 2014184153 A1 11/2014

OTHER PUBLICATIONS

"Vorrichtung zum Einstellen des Dreschkorbes an MA hdreschem", vol. 17, No. 6, Jun. 1, 1967.

*Primary Examiner* — Arpad Fabian-Kovas
(74) *Attorney, Agent, or Firm* — Patrick M. Sheldrake; Peter K. Zacharias

(57) ABSTRACT

An agricultural harvester includes an auger assembly including an auger having an auger shaft defining an axis of rotation and a fighting carried by the auger shaft, the auger being configured to rotate the fighting in a sweeping path about the axis of rotation and convey cleaned crop material toward the crop material elevator; an auger trough placed adjacent to the auger to hold crop material in the sweeping path; and an auger cover held above the sweeping path that is configured to direct flung crop material toward the auger and/or the auger trough.

7 Claims, 6 Drawing Sheets

(56) References Cited

U.S. PATENT DOCUMENTS

| | | | |
|---|---|---|---|
| 2,833,286 A | | 5/1958 | Haban |
| 3,045,804 A | | 7/1962 | Peterson |
| 3,070,221 A | * | 12/1962 | Bobrowski ............ B65G 33/24 |
| | | | 198/671 |
| 3,568,863 A | * | 3/1971 | Rohwedder ........ A01D 41/1208 |
| | | | 198/671 |
| 3,650,052 A | | 3/1972 | Maiste et al. |
| 3,841,536 A | | 10/1974 | Maiste et al. |
| 5,830,062 A | | 11/1998 | Schwinn et al. |
| 6,102,795 A | | 8/2000 | Behrens |
| 6,358,143 B1 | * | 3/2002 | Hurlburt ............ A01D 41/1208 |
| | | | 414/502 |
| 6,367,234 B1 | * | 4/2002 | Hurlburt ............ A01D 41/1208 |
| | | | 460/114 |
| 9,736,985 B2 | * | 8/2017 | Vandevelde ............ A01F 12/46 |
| 2014/0329572 A1 | * | 11/2014 | McCully .............. A01D 61/008 |
| | | | 460/114 |
| 2016/0113203 A1 | * | 4/2016 | Missotten ............... A01F 12/44 |
| | | | 460/114 |
| 2016/0316632 A1 | * | 11/2016 | Vandevelde ............ A01F 12/46 |

\* cited by examiner

AGRICULTURAL HARVESTER AUGER ASSEMBLY WITH CROP MATERIAL DEFLECTING COVER

BACKGROUND OF THE INVENTION

1. Field of the Invention

The present invention relates to agricultural harvesters, and, more particularly, to auger assemblies of an agricultural harvester.

2. Description of the Related Art

Combines are used to harvest agricultural crops such as corn, soybeans, wheat and other grain crops. As the combine is driven through crop fields, the combine cuts the crop, separates the desired crop from the undesired waste, stores the crop, and discards the waste.

In a typical combine, a header is mounted to the front of the combine to gather the crop and feed the crop into the combine for processing. As the combine is driven through the field, the crop material is collected by the header and deposited into a feeder housing. The crop material is then transported upwardly and into the combine by a feed elevator located within the feeder housing. The crop material then passes through a threshing and separating mechanism. In a rotary combine, the threshing and separating mechanism includes a rotor, a threshing concave, a rotor cage, and a separating grate. As crop material passes between the rotor, the threshing concave and the separating grate, the crop material is impacted and/or rubbed, thereby causing the grain to separate from the stalk material. The stalk material that is separated from the grain is commonly referred to as material other than grain (MOG). Other types of combines are also known that perform similar functions using different mechanisms.

After passing through the threshing and separating assembly, the grain and MOG are deposited onto a grain cleaning system. The grain cleaning system of a typical combine includes a plurality of adjustable cleaning sieves, often referred to as a chaffer sieve and a shoe sieve. The sieves are typically reciprocated back and forth in opposite directions along an arcuate path. This motion has the tendency to separate the grain from the MOG. To further separate the grain from the MOG, a cleaning fan or blower is positioned so as to blow air up through the cleaning sieves. This flow of air tends to blow the MOG, which is typically lighter than grain, rearwardly and out the back of the combine. Grain, which is heavier than MOG, is allowed to drop through the openings in the sieve.

The clean grain that falls through the cleaning sieves is deposited on a collection panel positioned beneath the cleaning sieves. The collection panel is angled so as to permit the grain to flow, under the influence of gravity, into an auger trough positioned along the lowermost edge of the collection panel. The auger trough is typically positioned near the forward end of the cleaning sieves and extends along the width of the sieves. The grain collected in the auger trough is then moved by an auger towards the side of the combine where it is raised by a grain elevator and deposited into a storage tank or grain tank. Other systems also exist that can utilize, for example, a loop conveyor system which eliminates the need for a conventional cross auger.

As combine size decreases, space within the combine becomes scarce. One way that a smaller amount of space within the combine has been utilized is by placing components of the combine closer together, but this space-saving can create its own unique issues. One such example of this is when the clean grain auger, which supplies the grain elevator with clean grain, is moved closer to the cleaning fan, or vice versa. As the clean grain auger rotates to convey clean grain to the elevator, grain can be flung due to centrifugal forces and get caught in the forced air stream produced by the cleaning fan. Grain being blown away by the forced air stream produced by the cleaning fan is an ineffective use of energy and results in a decrease in the combine cleaning capacity.

What is needed in the art is an auger assembly that can overcome some of the previously described disadvantages.

SUMMARY OF THE INVENTION

The present invention provides an auger assembly with an auger, an auger trough, and an auger cover over the auger that directs flung crop material toward the auger and/or auger trough.

The invention in one form is directed to an agricultural harvester including a chassis; a cleaning system carried by the chassis and configured to clean crop material; a crop material elevator carried by the chassis and supplied with cleaned crop material from the cleaning system; and an auger assembly carried by the chassis and configured to supply cleaned crop material from the cleaning system to the crop material elevator. The auger assembly includes an auger having an auger shaft defining an axis of rotation and a flighting carried by the auger shaft, the auger being configured to rotate the fighting in a sweeping path about the axis of rotation and convey cleaned crop material toward the crop material elevator; an auger trough placed adjacent to the auger to hold crop material in the sweeping path; and an auger cover held above the sweeping path that is configured to direct flung crop material toward the auger and/or the auger trough.

The invention in another form is directed to an auger assembly including an auger having an auger shaft defining an axis of rotation and a flighting carried by the auger shaft, the auger being configured to rotate the fighting in a sweeping path about the axis of rotation and convey cleaned crop material toward the crop material elevator; an auger trough placed adjacent to the auger to hold crop material in the sweeping path; and an auger cover held above the sweeping path that is configured to direct flung crop material toward the auger and/or the auger trough.

An advantage of the present invention is that the auger cover can redirect flung crop material toward the auger and/or auger trough to increase fill efficiency.

Another advantage is the auger cover can prevent crop material flung by the auger from being blown away by a forced air stream produced by a cleaning fan.

Yet another advantage is the auger cover can be configured to allow both front and rear filling of the auger trough.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention and such exemplification is not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
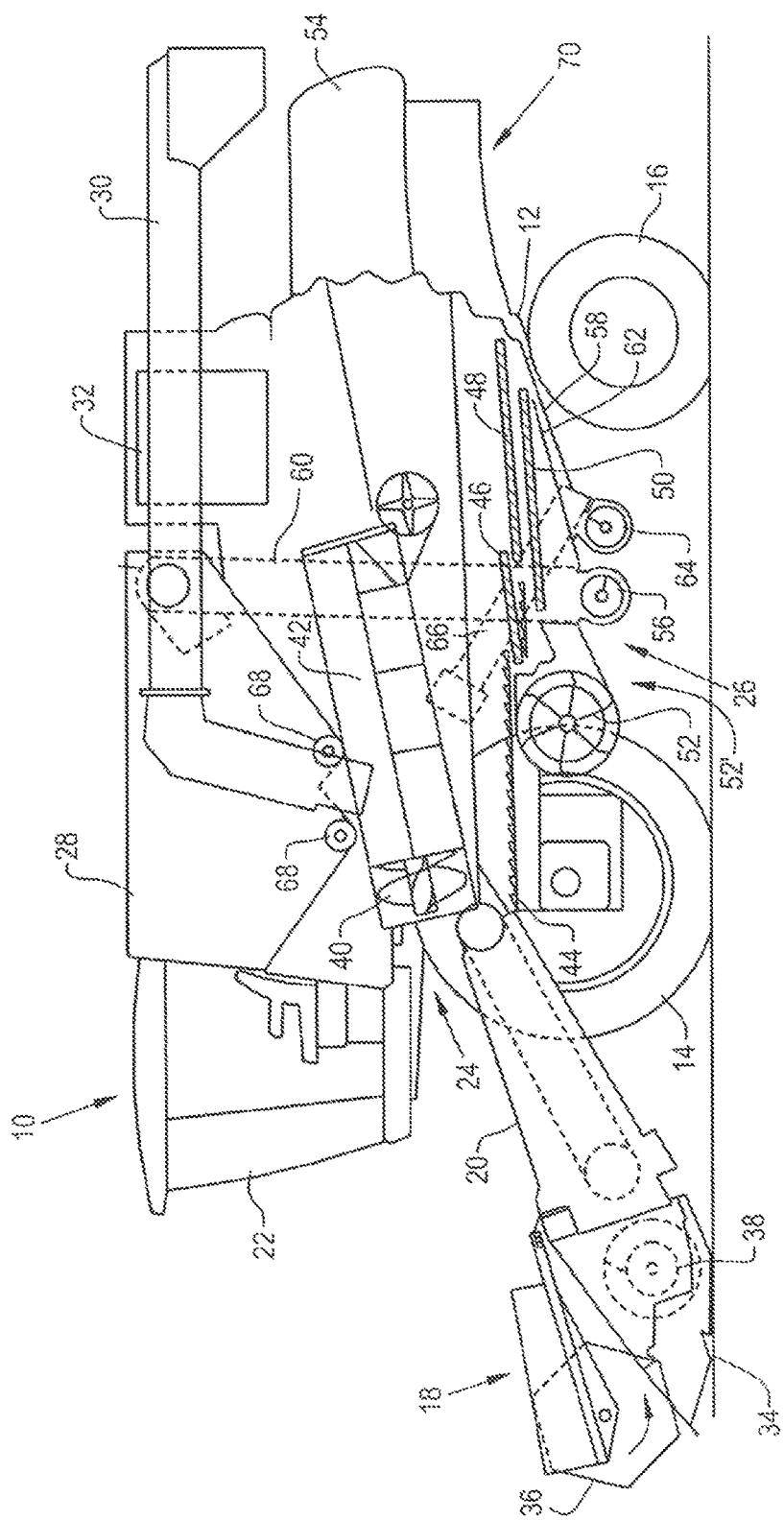
FIG. 1 is a side view of an embodiment of an agricultural harvester according to the present invention.

Referring now to the drawings, and more particularly to FIG. 1, there is shown an agricultural harvester in the form of a combine 10, which generally includes a chassis 12, ground engaging wheels 14 and 16, a header 18, a feeder housing 20, an operator cab 22, a threshing and separating system 24, a cleaning system 26, a grain tank 28, and an unloading auger 30. It should be appreciated that while the agricultural harvester is shown as combine 10, the agricultural harvester according to the present invention can be any type of construction that allows for crop material to be harvested such as a conventional combine (which does not have a rotor), rotary combine, hybrid combine, chopper harvester, etc.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or half tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 is of the axial-flow type, and generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a shoe sieve), and a cleaning fan 52. Grain on sieves 46, 48 and 50 is subjected to a cleaning action by fan 52 which provides an airflow through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and in front of lower sieve 50. Clean grain auger 56 receives clean grain from each sieve 48, 50 and from bottom pan 62 of cleaning system 26. Clean grain auger 56 conveys the clean grain laterally to a generally vertically arranged elevator 60, which can also be referred to as a grain elevator, for transport to grain tank 28. Tailings from cleaning system 26 fall to a tailings auger on 58. The tailings are transported via tailings auger 64 and return auger 66 to the upstream end of cleaning system 26 for repeated cleaning action. A pair of grain tank augers 68 at the bottom of grain tank 28 convey the clean grain laterally within grain tank 28 to unloading auger 30 for discharge from combine 10.

The non-grain crop material proceeds through a residue handling system 70. Residue handling system 70 may include a chopper, counter knives, a windrow door and a residue spreader.

Figure 2:
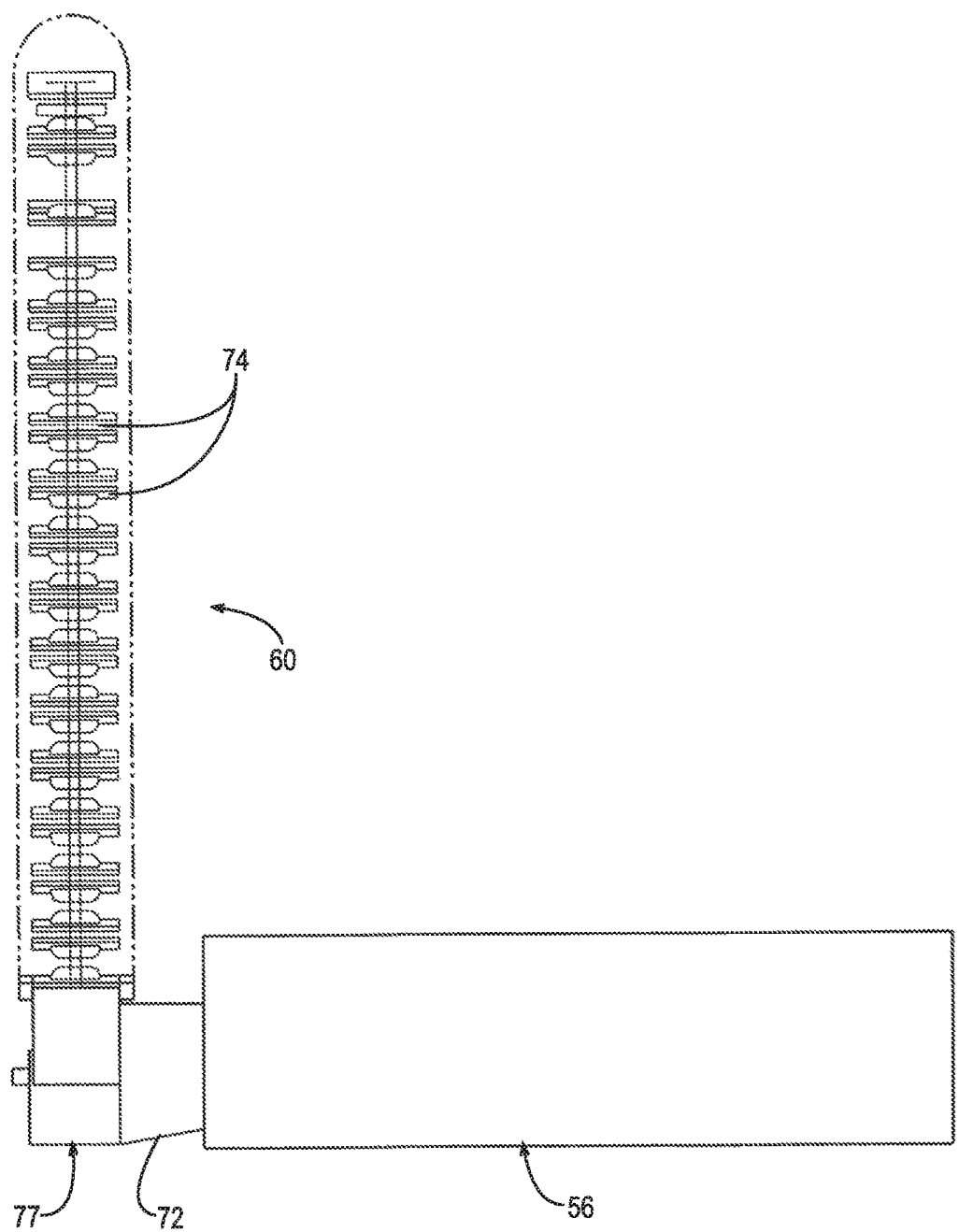
FIG. 2 is a cutaway perspective view of a portion of the agricultural harvester shown in FIG. 1, showing an auger assembly connected to a crop material elevator.

Referring now to FIG. 2, a portion of the agricultural harvester 10 with the elevator 60 is shown in better detail. The crop material is supplied to the elevator 60 from the cleaning system 26 (shown in FIG. 1) by the clean grain auger 56, which can also be referred to as an auger assembly and is shown generically as a block in FIG. 2 for ease of illustration. While the auger assembly 56 is described as conveying clean grain, it should be appreciated that the auger assembly 56 can be used to convey any type of crop material. As shown, the clean grain auger 56 can direct cleaned crop material toward an inlet 72 of the elevator 60 so that cleaned grain can be raised by paddles 74 inside the elevator 60. The elevator 60 has a boot portion 77 at its bottom where the paddles 74 transition from a downward travel through the elevator 60 to an upward travel. As shown, the inlet 72 can be formed as part of the boot portion 77. It should be appreciated that the elevator 60 can be supplied with crop material from more than one auger, but only one auger is illustrated for ease of description, and that the elevator 60 can have any construction suitable for moving crop material in an upward direction.

Figure 3:
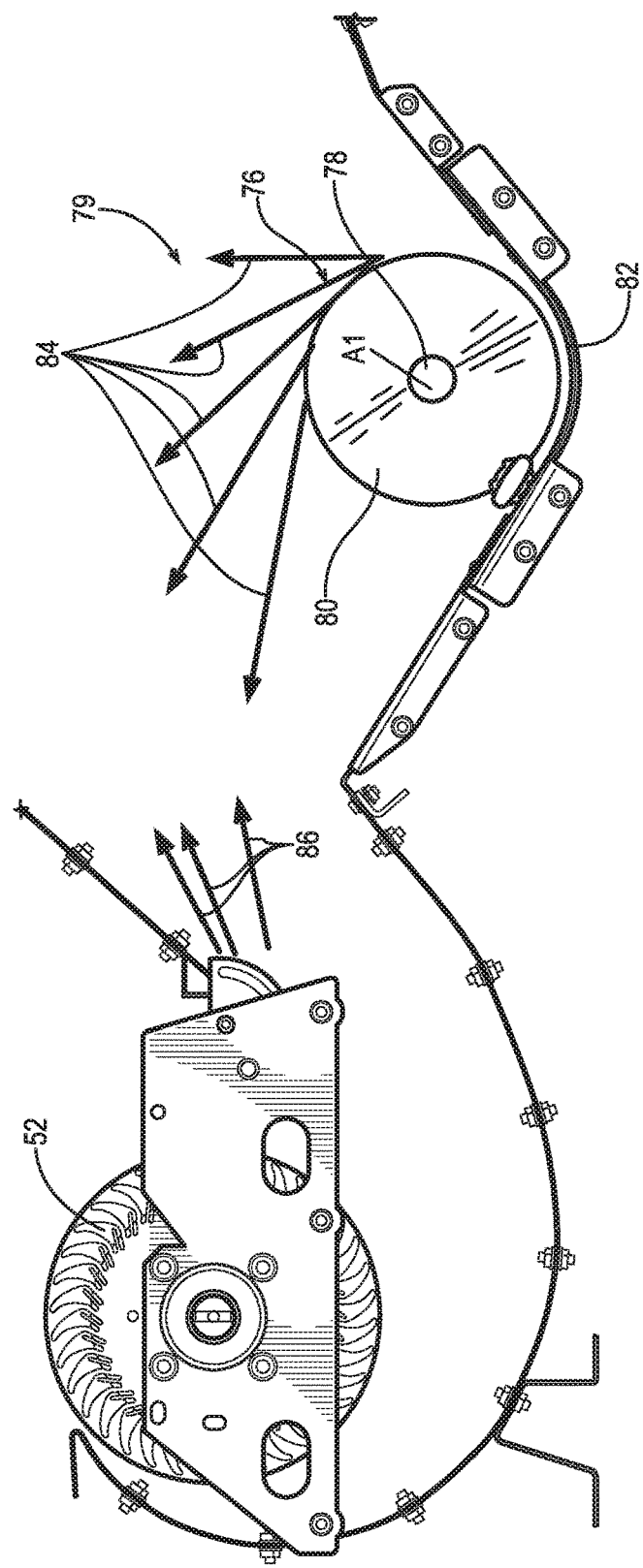
FIG. 3 is a sectional view of a prior art auger assembly with arrows drawn in to illustrate crop material being flung by the auger assembly.

Referring now to FIG. 3, a known auger assembly 79 is shown supplying clean grain to the elevator 60. The auger assembly 79 includes an auger 76 with an auger shaft 78 and a fighting 80 carried by the auger shaft 78 and an auger trough 82 placed adjacent to the auger 76. The auger shaft 78 defines an axis of rotation A1 and is driven so that the auger shaft 78 rotates about the axis of rotation A1, which extends into the page. As shown, the auger shaft 78 can rotate in the counter-clockwise direction so that the carried fighting 80 defines a sweeping path as it is rotated by the auger shaft 78. As used herein, the "sweeping path" refers to areas within the auger assembly 79 where the fighting 80 will travel as the auger shaft 78 rotates and can directly contact crop material held in the auger trough 82 to convey the crop material in a conveyance direction toward the elevator 60. The sweeping path, therefore, can generally encompass a circle defined about the auger shaft 78 with a radius equal to the distance of the fighting's 80 farthest point from the auger shaft 78.

As the auger 76 rotates, crop material that is held by the auger trough 82 adjacent to the auger 76 is scooped up by the fighting 80 so that the crop material rotates with the fighting 80 and advances along the length of the auger 76. The centrifugal forces produced by the fighting 80 against the crop material can cause the crop material being carried to be "flung" from the auger 76, as designated by the illustrated arrows 84. The flung crop material is no longer carried by the fighting 80, but is sent into the air. The cleaning fan 52, which is carried in close proximity to the auger assembly 56, produces a forced air stream, designated by arrows 86, that blows in the path of the flung crop material 84. When the forced air stream 86 contacts the flung crop material 84, the forced air stream 86 loses some of its velocity and the flung crop material 84 is forced in the direction of the forced air stream 86. The velocity lost by the forced air stream 86 to direct the flung crop material 84 can therefore not be used to separate MOG from desirable crop material, such as grain.

Figure 4:
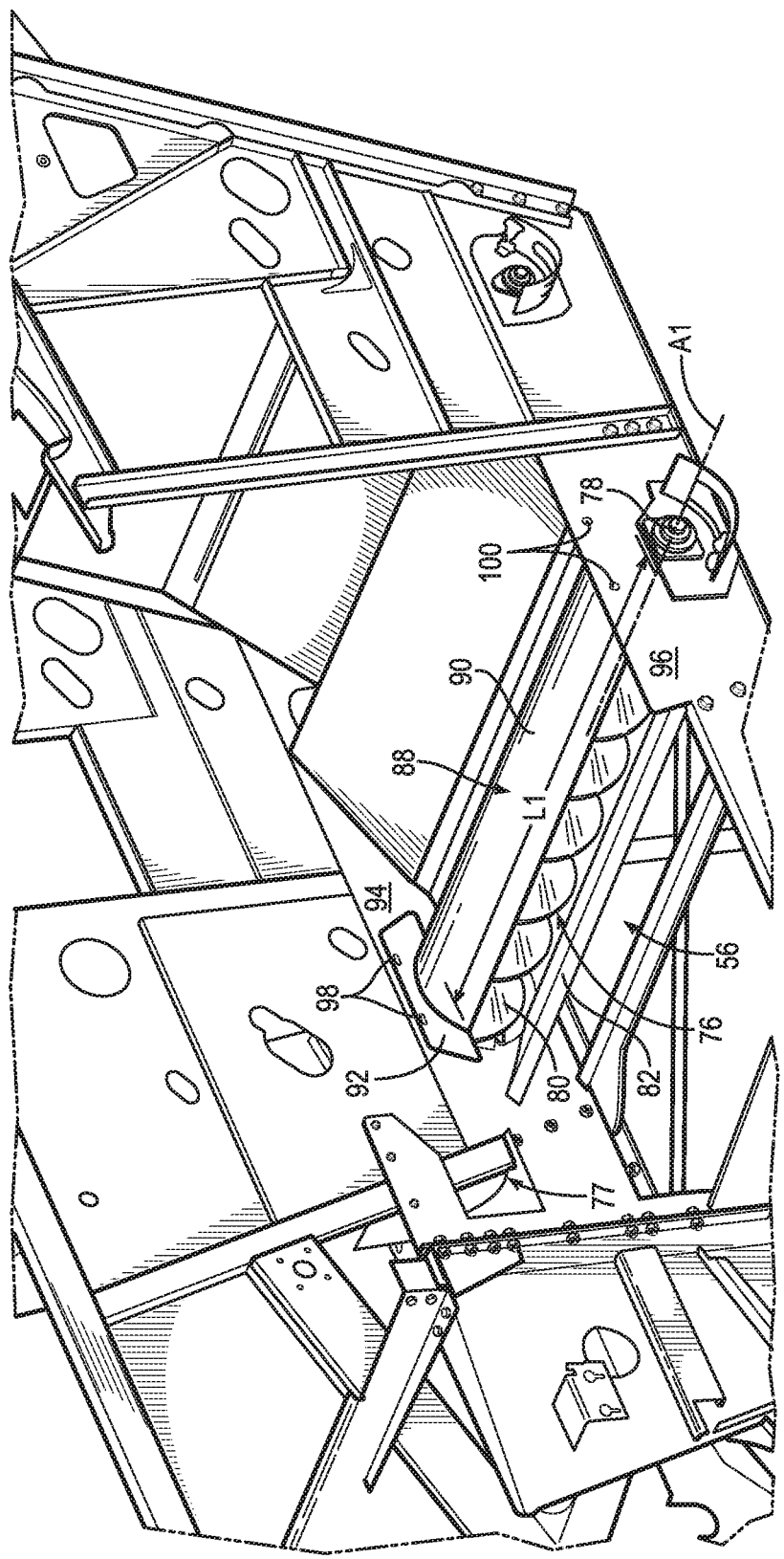
FIG. 4 is a perspective view of an embodiment of an auger assembly according to the present invention carried by the agricultural harvester shown in FIGS. 1-2.

Referring now to FIG. 4, an embodiment of an auger assembly 56 according to the present invention is shown. The auger assembly 56 generally includes the same components as auger assembly 79 shown in FIG. 3, with the addition of an auger cover 88 that is held above the sweeping path of the auger 76 and directs crop material flung by the auger 76 toward the auger 76, the auger trough 82, or both. The auger cover 88 can include a deflecting portion 90 and one or more mounting portions 92, with the deflecting portion 90 being held above the sweeping path of the auger 76 and the mounting portion(s) 92 being connected to side walls 94 and 96 of the auger assembly 56. The mounting portions 92 can be mounted to the side walls 94 and 96 by sets of mounting bolts 98 and 100, with mounting bolts 98 being used to mount one of the mounting portions 92 to the side wall 94 and mounting bolts 100 being used to mount the other mounting portion 92 to the side wall 96. The fighting 80, which conveys the crop material, can define a fighting length L1 that extends substantially between the side walls 94 and 96. The auger cover 88 can be held above the sweeping path defined by the flighting 80 so that the auger cover 88 is held above the entirety of the fighting length L1 to completely cover the flighting 80, but it is contemplated that the auger cover 88 can be held above only a portion of the flighting length L1 to cover only desired portions of the fighting 80. The boot portion 77 of the crop material elevator 60 can also be mounted to the side wall 94 of the auger assembly 56 using mounting bolts 98. Further, the auger shaft 78 of the auger 76 can be mounted to the side wall 96. When mounted to both side walls 94 and 96, the auger cover 88 can, in addition to deflecting flung crop material, act as a cross brace between the side walls 94 and 96 to provide added structural rigidity. Although shown as being mounted to both side walls 94 and 96, the auger cover 88 can be mounted to only one of the side walls 94 or 96 or otherwise held above the sweeping path without being mounted to either side wall 94 or 96.

Figure 5:
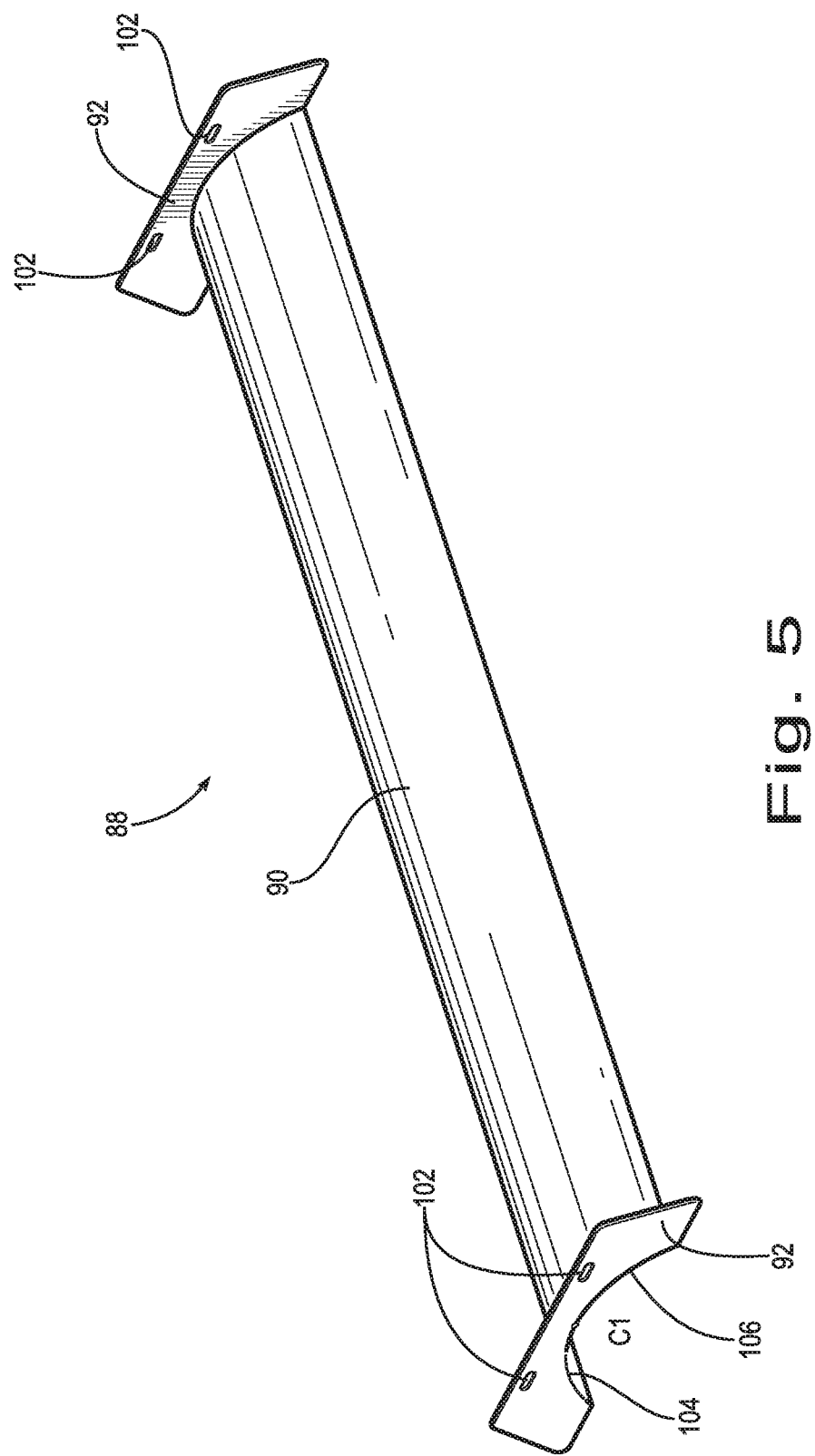
FIG. 5 is a perspective view of an embodiment of an auger cover according to the present invention that is included in the auger assembly shown in FIG. 4.

Referring now to FIG. 5, the auger cover 88 shown in FIG. 4 is illustrated separately to better describe its construction. As can be seen, the deflecting portion 90 can have the shape of an arc with an oval cross-section, although other shapes are also contemplated, from suitable materials such as sheet metal or polymer. The deflecting portion 90 can be formed as a symmetric shape, as shown, with two halves that are mirror images of one another or an asymmetric shape. The deflecting portion 90 can be connected to both mounting portions 92 by welding the deflecting portion 90 to the mounting portions 92, or otherwise. The mounting portions 92 can each include mounting openings 102 that the mounting bolts 98 and 100 will extend through to mount the mounting portions 92 to the side walls 94 and 96 of the auger assembly 56. It is useful for the mounting portions 92, if included, to be formed as shaped, flat sheets when the side walls 94 and 96 are sheets, but any suitable configuration for the mounting portions 92 can be chosen to hold the auger cover 88 above the sweeping path.

Figure 6:
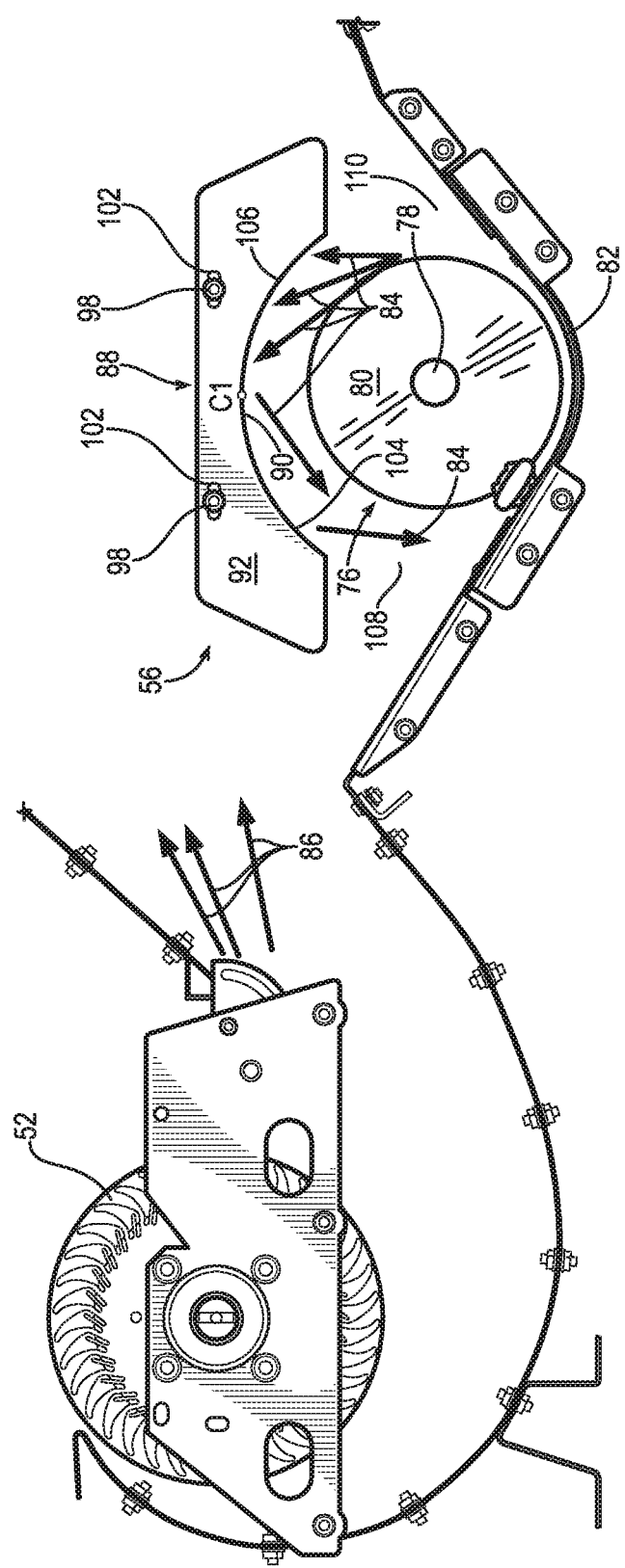
FIG. 6 is a sectional view of the auger assembly shown in FIG. 4 with arrows drawn in to illustrate crop material being flung by the auger assembly.

Referring now to FIG. 6, a sectional view of the agricultural harvester 10 is shown, similarly to FIG. 3, with the auger assembly 56 rather than known auger assembly 79. As can be seen, the auger assembly 56 is also carried adjacent to the cleaning fan 52 producing the forced air stream 86. Crop material carried by the auger 76 can still be flung, with flung crop material being designated as arrows 84, but rather than travelling into the forced air stream 86, the flung crop material 84 is redirected by the auger cover 88 toward the auger 76 and/or auger trough 82, depending on where the flung crop material 84 hits the deflecting portion 90 of the auger cover 88. It should therefore be appreciated that the auger cover 88 is held above the sweeping path of the flighting 80 so as not to interfere with rotation of the fighting 80 and conveyance of the crop material toward the elevator 60, while also directing the flung crop material 84 toward the auger 76 and/or the auger trough 82 to be picked up by the fighting 80 again and further conveyed toward the elevator 60. As can be seen, the auger cover 88 is held asymmetrically above the sweeping path so that a center C1 of the deflecting portion 90 is not held vertically orthogonal to the axis of rotation A1 of the auger 76 defined by the auger shaft 78. In other words, the auger cover 88 does not need to equally cover the auger 76 on both sides 104 and 106 of the auger cover 88, as can be seen in FIG. 6, but can have a greater coverage toward a front of the auger 76, which is closer to the cleaning fan 52, than a rear of the auger 76 to help prevent flung crop material 84 from being caught in the blowing path 86 of the air stream produced by the cleaning fan 52. Since crop material can be dropped onto the auger cover 88 from above, the front side 104 of the auger cover 88 and auger trough 82 can define a front crop material opening 108 therebetween and the rear side 106 of the auger cover 88 and auger trough 82 can define a rear crop material opening 110 therebetween which crop material can pass through, due to gravity and the shape of the auger trough 82. Such a configuration allows feeding of crop material into the sweeping path of the fighting 80 from both sides 104 and 106 of the auger cover 88, rather than one side. Typically, the majority of the crop material will be fed into the sweeping path through the rear crop material opening 110 due to the positioning of the lower sieve 50 (shown in FIG. 1) feeding crop material into the auger assembly 56. However, some crop material fed into the auger assembly 56 may roll over the top of the deflecting portion 90 to the front side 104, in which case having the front crop material opening 108 allows for such crop material to still fall into the sweeping path of the fighting 80. By holding the auger cover 88 asymmetrical above the sweeping path, the majority of the crop material dropped into the auger assembly 56 by the lower sieve 50 can be directed by the rear side 106 of the auger cover 88 to enter the sweeping path through the rear crop material opening 110 defined between the rear side 106 of the auger cover 88 and the auger trough 82. Further, placing the front side 104 of the auger cover 88 closer to the cleaning fan 52 can allow for the flung crop material 84 to be better protected from the forced air stream 86 produced by the cleaning fan 52.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural harvester, comprising:
   a chassis;
   a cleaning system carried by said chassis and configured to clean crop material, said cleaning system includes a cleaning fan that produces a forced gas stream defining a blowing path;
   a crop material elevator carried by said chassis and supplied with cleaned crop material from said cleaning system; and
   an auger assembly carried by said chassis and configured to supply cleaned crop material from said cleaning system to said crop material elevator, said auger assembly including:
   an auger having an auger shaft defining an axis of rotation and a fighting carried by said auger shaft, said auger being configured to rotate said flighting in a sweeping path about said axis of rotation and convey cleaned crop material toward said crop material elevator;
   an auger trough placed adjacent to said auger to hold crop material in said sweeping path; and
   an auger cover held above said sweeping path and configured to direct flung crop material toward at least one of said auger and said auger trough, said auger cover having a substantially arced shape and being configured such that crop material flung by said auger does not enter said blowing path.

2. The agricultural harvester according to claim 1, wherein said auger assembly includes a first side wall and a second side wall, said auger shaft and said auger cover both being mounted to at least one of said first side wall and said second side wall.

3. The agricultural harvester according to claim 1, wherein said auger trough and said auger cover define a front crop material opening and a rear crop material opening therebetween.

4. The agricultural harvester according to claim 1, wherein said fighting defines a fighting length and said auger cover is held above an entirety of said fighting length.

5. The agricultural harvester according to claim 1, wherein said auger cover defines a symmetrical shape.

6. The agricultural harvester according to claim 5, wherein said auger cover is asymmetrically held above said sweeping path.

7. The agricultural harvester according to claim 1, wherein said auger assembly has a first side wall and said crop material elevator has a boot portion mounted to said first side wall by at least one bolt, said at least one bolt also mounting said auger cover to said first side wall.

\* \* \* \* \*